United States Patent [19]

Sprayberry

[11] Patent Number: 4,879,835
[45] Date of Patent: Nov. 14, 1989

[54] EYELETLESS FISHING HOOK

[76] Inventor: James M. Sprayberry, 745 Ledyard Pl., Montgomery, Ala. 36109

[21] Appl. No.: 289,684

[22] Filed: Dec. 27, 1988

[51] Int. Cl.⁴ ............................................. A01K 91/04
[52] U.S. Cl. ................................................. 43/44.83
[58] Field of Search .................... 43/44.83, 44.9, 44.81, 43/44.96, 43.14, 43.39

[56] References Cited

U.S. PATENT DOCUMENTS

| | | | |
|---|---|---|---|
| 1,333,101 | 3/1920 | Cooper | 43/44.83 |
| 2,984,882 | 5/1961 | Winn | 43/44.83 |
| 3,036,399 | 5/1962 | Nishioka | 43/44.96 |
| 3,043,043 | 7/1962 | Parry | 43/43.1 |
| 3,604,143 | 9/1971 | Sauers | 43/44.83 |
| 4,137,664 | 2/1929 | Beres | 43/43.1 |
| 4,209,933 | 7/1980 | Manno | 43/44.83 |
| 4,361,977 | 12/1982 | Lawler | 43/44.83 |
| 4,674,226 | 6/1987 | Mahan | 43/44.83 |
| 4,796,377 | 1/1989 | Hosegood et al. | 43/43.1 |

Primary Examiner—M. Jordan

[57] ABSTRACT

An eyeletless fishing hook providing for secure attachment of fishing line, by means of a integral configuration of a fishing hook and sinker, eliminating the necessity of tying to an eyelet. The fishing device retains the ability of separate components to be adaptable to fishing needs, by varying the construction of the size, shape, and type of both the sinker and the hook.

3 Claims, 1 Drawing Sheet

EYELETLESS FISHING HOOK

BACKGROUND OF INVENTION

1. Field of Invention

This invention relates generally to a fishing device providing a means of a combined configuration of fishing hooks and sinkers for attaching to fishing line, without tying knots.

2. Description of Prior Art

Presently, fishermen use one of two methods to attach sinkers and hooks to fishing line. By one method, the hook is tied directly to the line and the sinker is either tied or crimped to the line, at a varying location above the hook. By the second method, the sinker weight is molded, into various geometric forms, around the hook shank, with the hook eyelet protruding. In this method the line is tied to the protruding eyelet, and is commonly referred to as a lead head jig. In generally accepted fishing practices, the first method usually employs organic fishing baits, such as minnows, worms, and cutbaits. Jigs, however, are usually adorned with various colors, designs, and inorganic attachments, such as plastic fliptails, rubber skirttails, and colored thread to lure fish. Both methods, require the time consuming necessity of attaching the fishing line to the fishing hook by knot tying. In both methods, some fishermen attach either a swivel or snap-and-swivel device to reduce line tangling and facilitate lure changing. Both devices still must be tied to the line so that the hook can be attached. When a swivel is used an additional knot is necessary. Regardless of the type of knot used, the fishing line must be passed through the hook eyelet. The type of knot is a matter of individual preference. However, literature for leading brands of fishing line recommend the use of the clinch knot, or modifications of the clinch knot. All such available literature also makes claims concerning knot strength of their lines. Such claims recognize that the tying of a knot in any line concentrates increase physical forces in and adjacant to the knot. Therefore, line failure is most likely to occur in the vicinity of the knot or hook eyelet. Certain knots, such as the clinch knot, are recommended to disperse the physical forces. This increases the line strength at its weakest point. However, the tying of any knot is both time consuming and creates varing degrees of reduction in the overall strength of the rigging. Additionally, many persons with physical disabilities, including poor eyesight or finger dexterity, cannot adequately tie a knot in fishing line. Many children and inexperienced fisherman have difficulty mastering the techniques of tying an effective fishing knot. Cold weather and night fishing conditions increase the time and difficulty of attaching both hooks and sinkers to line. There is a need for a product which facilitates attaching hooks, sinkers, jigs and other fishing tackle to fishing line.

SUMMARY OF THE INVENTION

As a general objective, the knotless fishing jig hook invention combines the features of a sinker and hook into an intergal unit. Unlike all other conventional lead head jigs, this invention does not require either knot tying or attachment of line to a conventional hook eyelet. Therefore, the knotless fishing jig hook overcomes the above mentioned disadvantages of existing fishing tackle.

It is an objective of this invention to reduce the time necessary for attaching and reattaching sinkers, hooks, jigs and lures.

It is an objective of this invention to provide assistance to visually impaired persons, and those with impaired hand dexterity with an easier and alternative method of attaching fishing tackle to fishing line.

It is an objective of this invention to provide a product to simplify the effective attachment of fishing tackle for the more inexperienced o infrequent fisherman.

It is an objective of this invention to more fully achieve the various rated strengths of fishing lines by eliminating the stress points of knots and the passing the line through the hook eyelet.

It is an objective of this invention to provide a product that continues utilization and combinations of various type hooks and sinker weights and geometric shapes in conjunction with the various baits and lure adornments.

It is an objective of this invention to provide a product for more easily attaching fishing tackle to fishing line during adverse low light levels and cold weather conditions. Under extreme conditions the knotless fishing jig hook can be attached at night using only the sense of touch and can also be attached in cold daylight hours while wearing light gloves It is an objective of this invention to eliminate the problem of paint removal from the hook eyelets of painted fishing jigs. While most fishermen remove the paint with pliers, knives, and other hook points, the problem is so prevasive that at least one special tool, for removing paint from jig hook eyelets, is commercially marketed. Although the knotless fishing jig hook may be painted the same as any other conventional jig, it has no external hook eyelet that can become clogged with paint.

DESCRIPTION OF PREFERRED EMBODIMENT

Figure 1:
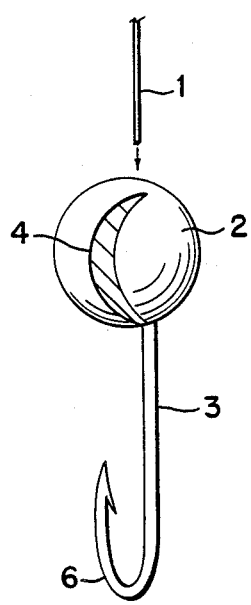
FIG. 1 is an outer frontal oblique view of an uncrimped round split shot sinker, with a smooth bite surface, and showing the initial point of entry of the fishing line.
Figure 2:
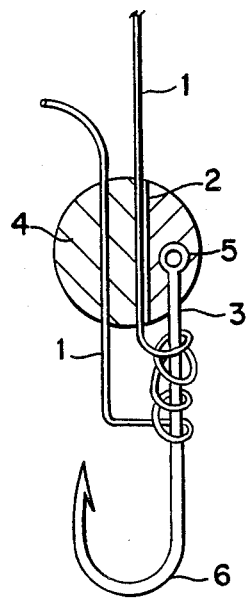
FIG. 2 is a cutaway side view showing the hook eyelet molded approximately center of mass and the trace of fishing line.
Figure 3:
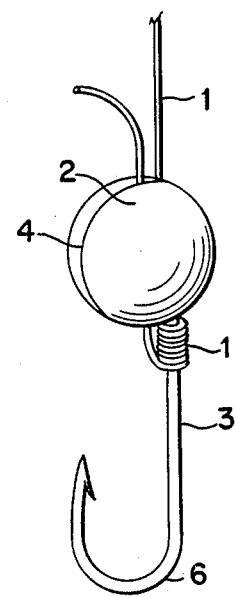
FIG. 3 is an outer side view of FIG. 2 as it would appear with the line tightened and crimped.

Referring to FIGS. 1, 2, and 3, shows the most basic embodiment of the knotless fishing jig hook. FIG. 1 shows the initial direction and point of entry of the line 1, into the sinker 2, in a direction parallel to the hook shaft 3, as the initial step in attachment. FIG. 2 illustrates a completed line 1 trace, having passed in sequence through the bite surfaces 4, wrapped four times around the hook shaft 3, and finally returning through the bite surfaces 4 in an opposite but parallel direction to initial entry. Four wraps of line 1 around the hook shaft 3 are considered an optimum number of wraps, based on test attachments.

FIG. 2 also shows the relative optimum position of the hook eyelet 5 as the approximate center of mass of the portion of the sinker 2 in an opposed location to the intersection of the bite surfaces 4. It should be noted that in none of Figures 1–5 does the hook eyelet 5 protrude the surface of the sinkers 2, this serves to enhance stabilization of the hook 6. However, it is envisioned that the combination of some geometric sinker 2 shapes and hook eyelet 5 sizes, the approximate center of sinker 2 mass, as described, may not be either the optimum or desired location of the hook eyelet 5. As a matter of individual fishing needs, the desired position of a hook 6 relative to the sinker 2 may determine the location of casting the hook eyelet 5 into the sinker 2.

The laws of physics applicable to stabilizing the hook 6, when cast, or otherwise, formed to a lead sinker 2, are recognized as limiting factors in locating the hook eyelet 5 within the sinker 2. However, it is not intended to imply that the use of hook eyelets 5 are the exclusive means of providing the desired statilization of the hook 6. The desired level of stabilization can also be accomplished by a variety of methods, such as bending or flattening of the hook shaft 3 or applying adhesive substances to same.

Further, the sinker 2 is generically referred to as a lead sinker because it is normally constructed of pure lead or alloyed lead. However, none of FIGS. 1-5 intend to either limit the materials used in the sinker 2 portion, or that the sinker 2 portion is necessairly intended to sink the hook 6. Rather, FIGS. 1-5 are intended to illustrate method of attaching the line 1 to the integral fishing device. In practical usage the sinker 2 portion may be constructed of lightweight materials meant for fastening but not expressly for sinking the hook 6, in accordance with fishing needs.

Figure 4:
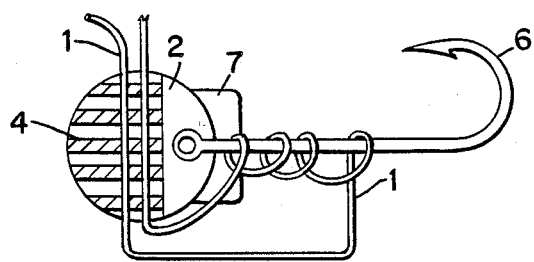
FIG. 4 is a cutaway side view of removable split shot sinker and line trace. The hook, however, is set at a right angle to the direction of line entry.

FIG. 3 shows a completed attachment with the line 1 pulled free of slack and bite surfaces 4 crimped together with sufficient pressure to prevent line 1 slippage. FIG. 4 illustrates the perferred configuration for reducing the pressure required to properly crimp the line 1 within the bite surfaces 4, thereby lessening the possibility of damage to the line 1. The bite surfaces 4, of FIG. 4, are corrugated to produce a more secure crimping of line 1, at lower crimping pressure, than would an equal but smooth bite surface 4. Most any treading of the bite surfaces 4 will produce increased resistance to line 1 slippage, as compared with smooth bite surfaces 4.

FIG. 4 also illustrates the use of bite wings 7, as used to decrease the pressure of crimped bite surfaces 4 on the line 1. When a pair of bite wings 7 are pressed together the sinker 2 is easily removed. With respect to knotless fishing jig hooks, pressing the bite wings 7 together will remove both the sinker 2 and the hook 6. Depending on sinker 2 configuration and its materials, crimping and uncrimping may be accomplished using only finger pressure. However, at other times, the crimping process will be accomplished with pliers or other tools.

FIG. 4 further depicts the rigging of the knotless fishing jig hooks to duplicate the effect of offset hooks, which some fishermen perfer, and are often used in making lead head jigs. These hooks, while not illustrated, have the eyelet situated at a right angle to the hook shaft, by bending the hook shaft and eyelet toward the remaining hook axis. When offset hooks are employed in jigs, it allows the long axis of the hook 6 to assume a position more closely approximating both parallel to the water surface an perpendicular to the long axis of the line 1.

Figure 5:
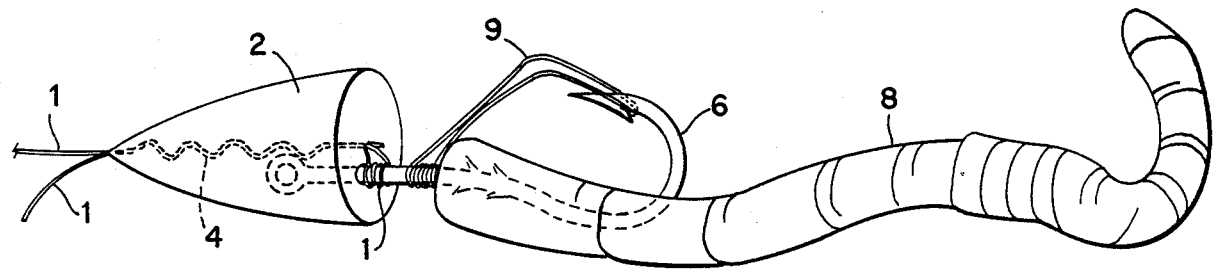
FIG. 5 is an outer side view of a bullet lead head with corrugated bite surface, line trace, and weedless baitkeeper hook with attached plastic worm bait.

FIG. 5 shows the adaption of knotless fishing jig hook to a bullet lead head sinker 2. The attachment of the line 1 is shown completed through a corrugated bite surface 4. The plastic worm bait 8 is illustrated as attached to a weedless hook 6 design, using a wire weed guard 9. Even without a weed guard 9, the knotless fishing jig hook reduces the chances of accidental snagging of the hook 6. This is because the hook 6 maintains a fixed position behind the sinker 2, thereby avoiding man snagging situations.

FIG. 5 further illustrates the variety of fishing situations to which the knotless fishing jig can be adapted. The means of attachment illustrated in FIGS. 1-5 can be used for attaching other types of fishing devices, such casting plugs and spinning baits and lures. The means of attachment used in FIGS. 1-5 can also comprise, using appropriate scales and materials, a fastening device for other than fishing purposes, although the preferred embodiment is a fishing device to attach fishing line. FIGS. 1-5 are also intended to comprise a fishing device that is applicable to both saltwater and freshwater fishing.

I claim:

1. A fish hook lacking an exterior accessible eyelet for connection to a fishing line comprising:
   a hook with a barb and shaft,
   an eyeletless gripping member,
   said eyeletless gripping member being rigidly affixed longitudinally to the opposite end of the hook shaft from the hook barb, said gripping member further having a single open aperture which has a pair of opposite gripping surfaces with an inwardly facing bite surface into which an external flexible connecting means is disposed, said flexible connecting means passing sequentially through the gripping member around the hook shaft and returning parallel through the gripping member to the point of entry, said gripping member and flexible connecting means being affixed together by pressure closing the pair of opposite gripping surfaces of the aperture around the flexible connecting means thereby forming an extended integral unit, composed of an eyeletless hook with a gripping means gripping a flexible connecting means.

2. The fish hook lacking an exterior accessible eyelet of claim 1 wherein said eyeletless gripping member is a sinker.

3. The fish hook lacking an exterior accessible eyelet of claim 1 wherein said eyeletless gripping member is round.

* * * * *